US006058977A

United States Patent [19]

Hotta

[11] Patent Number: 6,058,977

[45] **Date of Patent: *May 9, 2000**

[54] RUBBER STOPPER FOR WATERPROOF CONNECTOR

[75] Inventor: Tomoyuki Hotta, Shizuoka, Japan

[73] Assignee: Yazaki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/018,468

[22] Filed: Feb. 4, 1998

[30] Foreign Application Priority Data

Feb. 6, 1997 [JP] Japan .................................... 9-023957

[51] Int. Cl.[7] ............................. F16L 55/10; H01R 13/52

[52] U.S. Cl. .................................... 138/89; 220/DIG. 19; 220/801; 220/601

[58] Field of Search ............................... 138/89; 215/355; 220/DIG. 19, 799, 800, 801, 804, 601

[56] References Cited

FOREIGN PATENT DOCUMENTS 61-8971 1/1986 Japan .

*Primary Examiner*—Patrick Brinson

*Attorney, Agent, or Firm*—Morgan, Lewis & Bockius LLP

[57] ABSTRACT

A superb rubber stopper for a waterproof connector in that it is free from the lowering of sealing performance against center shifting and unnatural loading to ensure that a connector housing is hermetically sealed. The rubber stopper 10 for a waterproof connector has a cylindrical body portion 11 into which the electric wire 5 is fitted, a plurality of sealing protrusions 12 which are protruded in an annular form along the outer peripheral face of the body portion 11 and capable of adhering to the inside wall surface 2*a* of the terminal receiving hole, and a series of reinforcing walls 13, each of which is provided between the sealing protrusions 12 in such a manner as to extend in the axial direction.

32 Claims, 4 Drawing Sheets

RUBBER STOPPER FOR WATERPROOF CONNECTOR

BACKGROUND OF THE INVENTION

The present invention relates to a rubber stopper for a waterproof connector and more particularly to improvements in rubber stoppers for waterproof connectors, which rubber stopper is inserted into the terminal receiving hole of a connection-terminal holding chamber of a connector housing in order to hermetically seal the connection-terminal holding chamber in a liquid-tight fashion.

Heretofore, connectors of various types have been used for connecting electric wires. Waterproof connectors designed to prevent the penetration of water and the like from the outside are fitted with waterproofing rubber stoppers for preventing rainwater and the like from penetrating into the connectors by hermetically sealing the gap between an electric wire and the inside wall surface of the terminal receiving hole of the connection-terminal holding chamber (hereinafter also called "cavity") of, for example, a connector housing in a liquid-tight fashion.

Japanese Utility Model Unexamined Publication No. Sho. 61-8971, for example, discloses a rubber stopper for a waterproof connector of the sort mentioned above. FIG. 1 schematically illustrate the structure of such a rubber stopper for a waterproof connector, wherein a rubber stopper 6 for a waterproof connector comprises a first half portion having a cylindrical terminal pressure-fitting portion 9, and a second half portion having a sealing portion 8 continuous to the terminal pressure-fitting portion 9. Further, parallel sealing protrusions 8*a*, 8*b*, 8*c* are formed in the sealing portion 8.

A pair of plate-like ribs 7*a*, 7*b* gradually rising toward to the top of the sealing protrusion 8*a* from the front end edge are formed integrally with the terminal pressure-fitting portion 9 and the sealing portion 8 on the outer periphery of the terminal pressure-fitting portion 9. The upper plate-like rib 7*a* is formed so that it is prevented from interfering with the pressure-fitting piece 4 of a connecting terminal 3, whereas the first half portion of the lower plate-like rib 7*b* is compressed by the pressure-fitting piece 4 and fitted to the connecting terminal 3. Consequently, the electric wire 5 is fitted into the rubber stopper 6 for a waterproof connector in a liquid-tight fashion.

When the rubber stopper 6 for a waterproof connector is inserted into the cavity 2 of the connector housing 1, the tilted plate-like ribs 7*a*, 7*b* are brought into contact with the terminal receiving hole of the cavity 2 so as to automatically adjust the central position even though the center of the rubber stopper 6 shifts from the center of the cavity 2. Even when the sealing protrusions 8*a*, 8*b*, 8*c* are forced in while being inserted obliquely because of the lack of uniformity of loading force, the plate-like ribs 7*a*, 7*b* act like springs when the loading force is removed and are able to make the sealing portion 8 properly function by correcting the posture of the sealing protrusions 8*a*, 8*b*, 8*c*.

In the case of such a waterproofing rubber stopper 6 as disclosed in Japanese Utility Model Unexamined Publication No. Sho. 61-8971, the connecting terminal 3 may be pressure-fitted slantwise to the rubber stopper 6 for a waterproof connector or the rubber stopper 6 for a waterproof connector may be inserted obliquely into the terminal receiving hole of the cavity 2, which forces part of sealing portion 8 to rub itself against the inside wall surface 2*a* of the terminal receiving hole. As a result, the rear sealing protrusions 8*b*, 8*c* excluding the sealing protrusion 8*a* become twisted as shown in FIG. 2.

When the connecting terminal 3 is pressure-fitted to the rubber stopper 6 for a waterproof connector, there is the possibility that the pressure-fitting piece 4 injures the plate-like ribs 7*a*, 7*b*, thus impairing the function of the plate-like ribs 7*a*, 7*b*.

Therefore, the adhesion of the sealing protrusions 8 of the rubber stopper 6 for a waterproof connector to the inside wall surface of the terminal receiving hole of the connector housing 1 is spoiled and this may deteriorate the sealing performance originally intended to hermetically seal the interior of the connecting housing 1 in a liquid-tight fashion.

SUMMARY OF THE INVENTION

An object of the present invention made to solve the foregoing problems is to provide such a superb rubber stopper for a waterproof connector as is free from the lowering of sealing performance against center shifting and unnatural loading to ensure that a connector housing is hermetically sealed.

In order to accomplish the object above, a rubber stopper for a waterproof connector, according to the present invention, to be inserted into the terminal receiving hole of a waterproof connector housing so as to hermetically seal a terminal holding chamber, comprises:

a cylindrical body portion;

a plurality of annular sealing protrusions are provided along the outer peripheral face of the cylindrical body portion and extended in a substantially circumferential direction of the cylindrical body portion; and a number of reinforcing walls provided between the adjacent annular sealing protrusions and extended in the axial direction of the cylindrical body portion.

In the above-mentioned rubber stopper for a waterproof connector, each of the reinforcing walls is preferably high enough to be brought into contact with the inside wall surface of the terminal receiving hole when it is inserted into the terminal receiving hole.

In addition, in the above-mentioned rubber stopper for a waterproof connector, the reinforcing walls may be arranged at equal intervals in the substantially circumferential direction.

Further, in the above-mentioned rubber stopper for a waterproof connector, the reinforcing walls are preferably arranged at equal intervals of 90° in the substantially circumferential direction.

Furthermore, in the above-mentioned rubber stopper for a waterproof connector, the reinforcing wall may be aligned with the adjacent reinforcing wall in the axial direction.

With the arrangement above, the plurality of sealing protrusions are axially coupled to each other by the respective reinforcing walls, and these sealing protrusions are interlocked with each other. Therefore, these sealing protrusions which are interlocked with each other generate force of repulsion even though unnatural force acts on part of the sealing protrusions and are prevented from becoming twisted.

Since a series of reinforcing walls is provided over the plurality of sealing protrusions in such a manner that each of them is installed between the sealing protrusions, moreover, the reinforcing wall is never damaged when the connecting terminal is pressure-fitted.

With the provision of the reinforcing wall which is high enough to be brought into contact with the inside wall surface of the terminal receiving hole when it is inserted into the terminal receiving hole, moisture can be locked into the portion enclosed with the reinforcing wall and the adjoining sealing protrusions in a case where the moisture penetrates through the gap between the sealing protrusion and the inside wall surface of the terminal receiving hole, so that the moisture is prevented from penetrating further.

DESCRIPTION OF THE PREFERRED EMBODIMENT

Referring to the accompanying drawings, there is given a detailed description of an rubber stopper for a waterproof connector according to the present invention.

Figure 1:
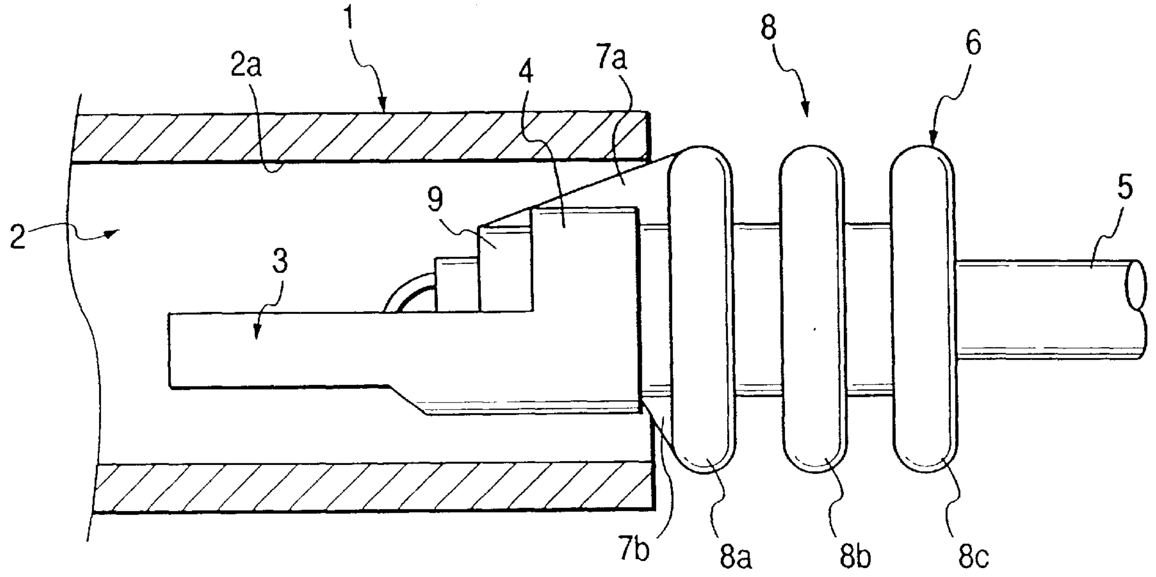
FIG. 1 PRIOR ART
FIG. 1 is a partial sectional side view showing a state in which a conventional rubber stopper for a waterproof connector is fitted to a connector housing.
Figure 2:
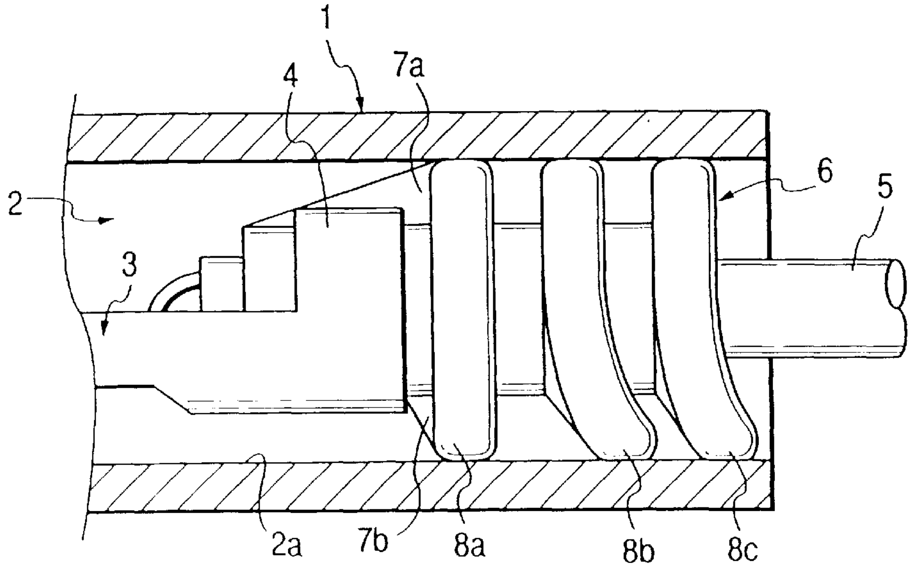
FIG. 2 PRIOR ART
FIG. 2 is a partial sectional side view showing problems inherent to the conventional rubber stopper for a waterproof connector.
Figure 3:
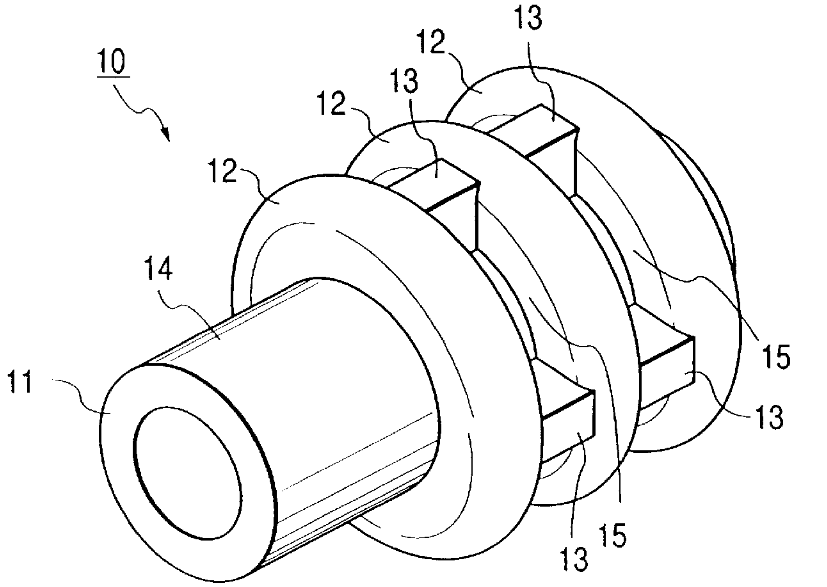
FIG. 3 is an overall perspective view of a rubber stopper for a waterproof connector embodying the present invention.
Figure 4:
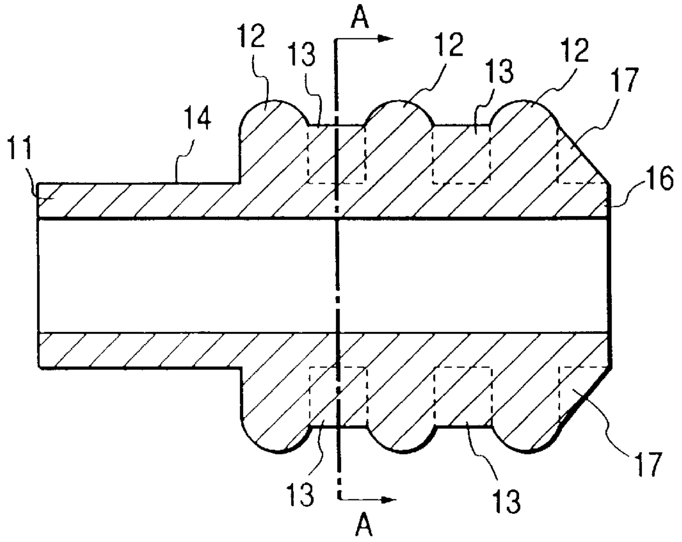
FIG. 4 is a vertical sectional view of the rubber stopper for a waterproof connector shown in FIG. 3.
Figure 5:
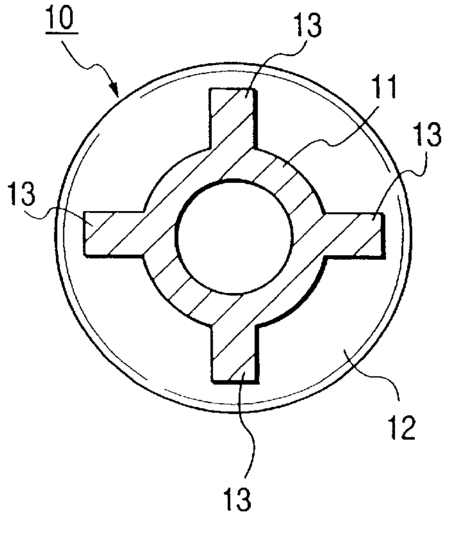
FIG. 5 is a transverse sectional view taken on line A—A of FIG. 4.
Figure 3A:
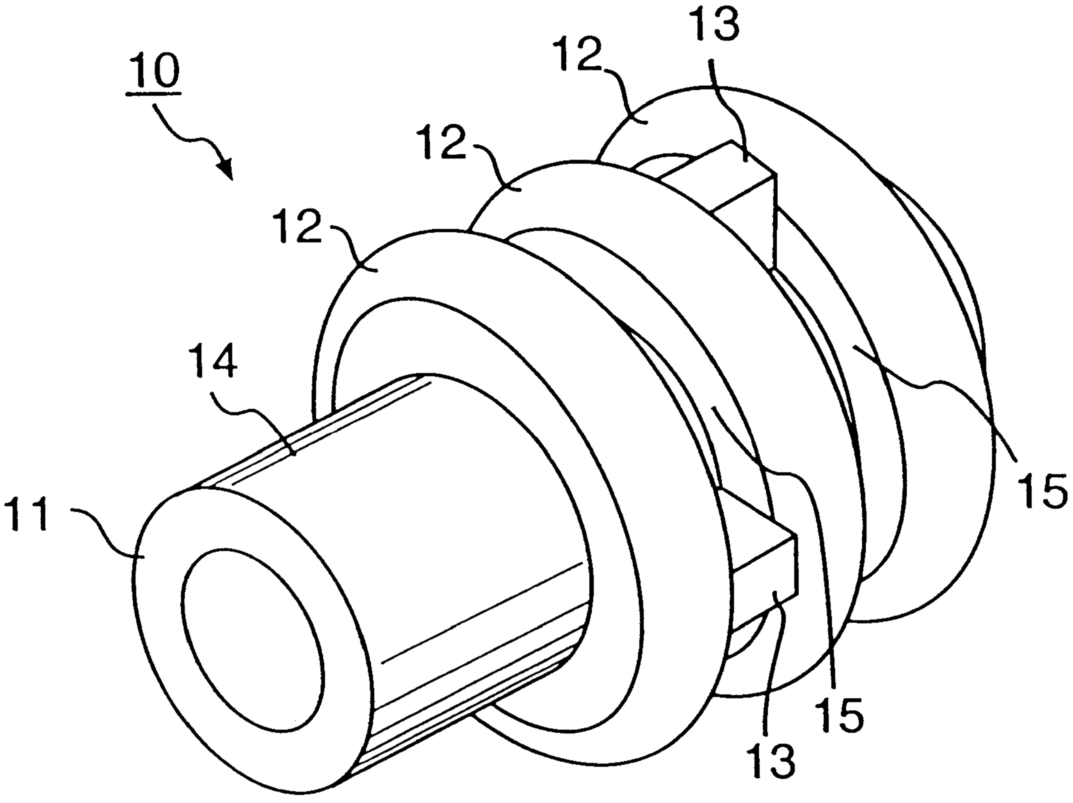
FIG. 3A shows the rubber stopper of the present invention with alternately arranged walls.
Figure 6:
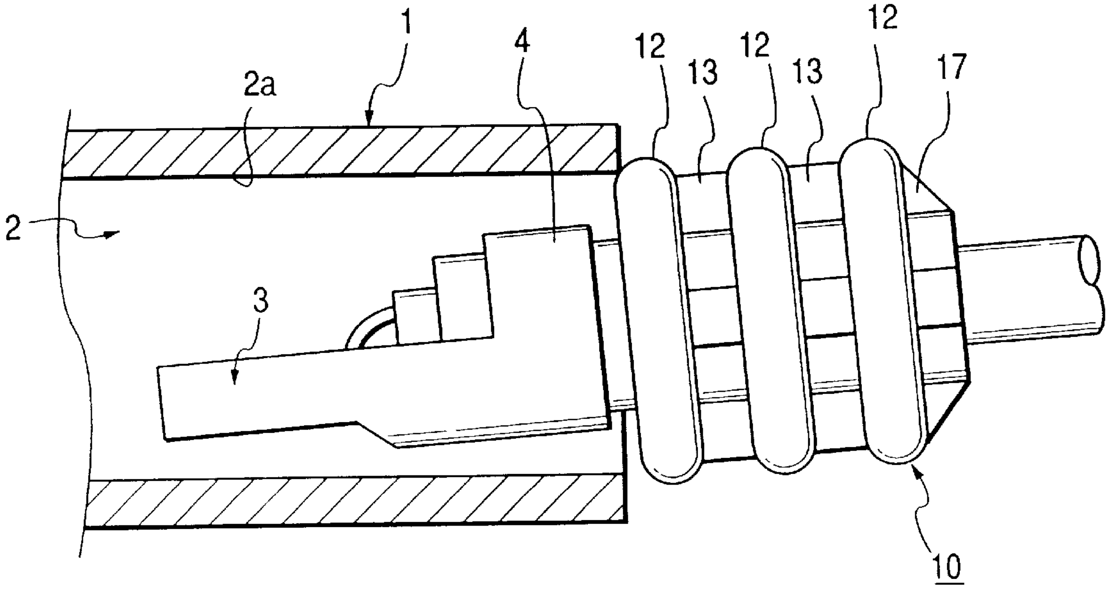
FIG. 6 is a partial sectional side view showing a state in which the rubber stopper for a waterproof connector shown in FIG. 3 is fitted to a connector.

FIG. 3 is an overall perspective view of a rubber stopper for a waterproof connector embodying the present invention; FIG. 4, a vertical sectional view of the rubber stopper for a waterproof connector shown in FIG. 3; FIG. 5, a transverse sectional view taken on line A—A of FIG. 4; FIG. 6, a partial sectional side view showing a state in which the rubber stopper for a waterproof connector shown in FIG. 3 is fitted to a connector; and FIG. 7, a partial sectional side view showing a state in which the rubber stopper for a waterproof connector according to the present invention is fitted to a connector housing.

A rubber stopper 10 for a waterproof connector as shown in FIG. 3 is used for hermetically sealing, in a liquid-tight fashion, the gap between the inside wall surface 2*a* of a terminal receiving hole and an electric wire 5 by adhering to the inside wall surface 2*a* of the terminal receiving hole of a connector housing 1 for connecting electric wires 5.

Figure 7:
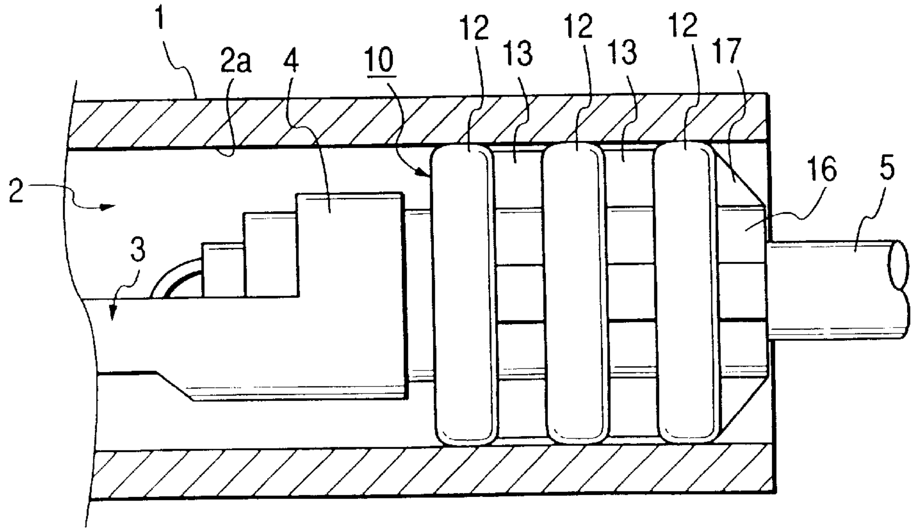
FIG. 7 is a partial sectional side view showing a state in which the rubber stopper for a waterproof connector according to the present invention is fitted to a connector housing.

The rubber stopper 10 for a waterproof connector comprises a cylindrical body portion 11 into which the electric wire 5 is fitted, three sealing protrusions 12 which are protruded in an annular form along the outer peripheral face of the body portion 11 and capable of adhering to the inside wall surface 2*a* of the terminal receiving hole, and a series of reinforcing walls 13, each of which is provided between the sealing protrusions 12 in such a manner as to extend in the axial direction (see FIG. 7).

The body portion 11 is, as shown in FIG. 3, in a cylindrical form in conformity with the cross section of the electric wire 5 and when the electric wire 5 is fitted into the body portion 11, the body portion 11 adheres to the outer peripheral face of the electric wire 5 to ensure that moisture content such as rainwater is prevented from penetrating through the gap between the body portion 11 and the electric wire 5. Further, the front end portion of the body portion 11 is made a terminal pressure-fitting portion 14, so that the electric wire 5 is pressure-fitted by the pressure-fitting piece 4 of the connecting terminal 3. Since the reinforcing wall 13 is serially connected between the sealing protrusions 12, the connecting terminal 3 is never damaged when pressure-fitted.

The sealing protrusion 12 is in an annular form and perpendicularly extended in a circumferential direction with respect to the axis of the body portion 11, and its outer peripheral portion is flexibly deformed so as to adhere to the inside wall surface 2*a* of the terminal receiving hole of the connector housing 1 to ensure that moisture content such as rainwater is prevented from penetrating through the gap between the sealing protrusion 12 and the inside wall surface 2*a* of the terminal receiving hole.

The reinforcing walls 13 are each disposed in two groove portions 15 among the three sealing protrusions 12, that is, rib portions extending in the axial direction and both ends of each reinforcing wall 15 are connected to the respective sealing protrusion 12. Further, the reinforcing walls 13 are arranged at equal intervals of 90° in the circumferential direction as shown in FIG. 5, whereby the waterproofing rubber stopper 10 according to this embodiment of the present invention has eight reinforcing walls 13 in total.

In this arrangement of the waterproofing rubber stopper 10, four plate-like ribs 17 in total in a triangular side view are provided between the rear end portion 16 of the body portion 11 and the rearmost sealing protrusion 12 in such a manner as to align with the reinforcing wall 13 in the axial direction.

Subsequently, the function of the rubber stopper 10 for a waterproof connector thus structured according to this embodiment of the present invention will be described with reference to FIGS. 6–7.

First, the electric wire 5 is fitted into the body portion 11 of the waterproofing rubber stopper 10 and the body portion 11 is fixedly pressure-fitted to the connecting terminal 3 while it is integrally gripped together with the electric wire 5 by the pressure-fitting piece 4. When the rubber stopper 10 together with the connecting terminal 3 is inserted into the cavity 2 of the connector housing 1, the outer peripheral portions of the sealing protrusions 12 are flexibly deformed and made to adhere to the inside wall surface 2*a* of the terminal receiving hole of the cavity 2, whereby the gap between the inside wall surface 2*a* of the terminal receiving hole of the connector housing 1 and the electric wire 5 is hermetically sealed in a liquid-tight fashion.

At this time, three of the sealing protrusions 12 of the rubber stopper 10 according to this embodiment of the present invention are coupled together in the axial direction with the respective reinforcing walls 13 held therebetween, and these sealing protrusions 13 are interlocked. Then the rubber stopper 10 are obliquely inserted into the cavity 2 of the connector housing 1 as shown in FIG. 6 and even when unnatural force is applied to the forefront sealing protrusion 12, the sealing protrusions 12 are prevented from becoming twisted because great force of repulsion is generated by the interlocked sealing protrusions 12.

With the provision of the rubber stopper 10 for a waterproof connector according to this embodiment of the present invention, the adhesion of the sealing protrusions 12 to the inside wall surface 2*a* of the terminal receiving hole of the connector housing 1 is not impaired because of the twisting of the sealing protrusions 12 to ensure that the gap between the electric wire 5 and the inside wall surface of the connector housing 1 is hermetically sealed in the liquid-tight fashion and that moisture content such as rainwater is prevented from penetrating into the connector housing 1 accordingly.

Further, the formation of the reinforcing wall 13 which is high enough to be brought into contact with the inside wall surface 2*a* of the terminal receiving hole when it is inserted into the terminal receiving hole of the cavity 2 makes it possible to lock water into the portion enclosed with the reinforcing wall 13 and the adjoining sealing protrusions 12 even in a case where the water is allowed to penetrate through the gap between the sealing protrusion 12 and the inside wall surface 2*a* of the terminal receiving hole; thus, the water is prevented from penetrating therethrough any longer.

The rubber stopper for a waterproof connector according to the present invention is not restricted to the above-described embodiment but may needless to say be modified in various manners.

In the aforesaid embodiment of the present invention, though the reinforcing walls 13 have been arranged linearly in the axial direction, for example, they may be arranged alternately. Moreover, the shape of the reinforcing wall and the number of them may also be adequately altered.

Although the rubber stopper 10 for a waterproof connector according to aforesaid embodiment of the present invention is to be provided for each electric wire 5 of the connecting terminal in the cavity 2, the present invention is applicable to such a rubber stopper for a waterproof connector as is used for hermetically sealing free cavities of a multi-polar connector in order to prevent water from penetrating into connector housings.

As is obvious from the description above, the rubber stopper for a waterproof connector according to the present invention is such that a series of reinforcing walls extended in the axial direction is provided in such a manner that each reinforcing wall is placed between the annular sealing protrusions which are protruded along the outer peripheral face of the rubber stopper for a waterproof connector.

Then the rubber stopper for a waterproof connector according to the present invention is obliquely inserted into the connector housing and when only part of the sealing protrusions is caused to strongly rub itself against the inside wall surface of the terminal receiving hole, the sealing protrusions are prevented from becoming twisted because great force of repulsion is generated by the interlocked sealing protrusions.

It is therefore possible to provide a superb rubber stopper for a waterproof connector which is free from the lowering of sealing performance against center shifting and unnatural loading to ensure that a connector housing is hermetically sealed.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rubber stopper for a waterproof connector to be inserted into the terminal receiving hole of a waterproof connector housing so as to hermetically seal a terminal holding chamber, comprising:

a cylindrical body portion formed of rubber and having a through hole coaxial with the cylindrical body portion;

a plurality of annular sealing protrusions along an outer peripheral face of the cylindrical body portion and extended in a substantially circumferential direction of the cylindrical body portion; and a plurality of reinforcing walls provided between adjacent annular sealing protrusions and extended in an axial direction of the cylindrical body portion wherein the plurality of reinforcing walls prevents the annular sealing protrusions from buckling.

2. The rubber stopper for a waterproof connector as claimed in claim 1, wherein each of the reinforcing walls is high enough to be brought into contact with an inside wall surface of the terminal receiving hole when inserted into the terminal receiving hole.

3. The rubber stopper for a waterproof connector as claimed in claim 1, wherein the reinforcing walls are arranged at equal intervals in the substantially circumferential direction.

4. The rubber stopper for a waterproof connector as claimed in claim 1, wherein the reinforcing walls are arranged at intervals of 90° in the substantially circumferential direction.

5. The rubber stopper for a waterproof connector as claimed in claim 1, wherein each of the reinforcing walls is aligned with an adjacent reinforcing wall in the axial direction.

6. A rubber stopper for a waterproof connector to be inserted into the terminal receiving hole of a waterproof connector housing so as to hermetically seal a terminal holding chamber, comprising:

a cylindrical body portion having a through hole coaxial with the cylindrical body portion;

at least three annular sealing protrusions along an outer peripheral face of the cylindrical body portion and extended in a substantially circumferential direction of the cylindrical body portion; and a plurality of reinforcing walls provided between adjacent annular sealing protrusions and extended in an axial direction of the cylindrical body portion wherein the plurality of reinforcing walls prevents the annular sealing protrusions from buckling.

7. The rubber stopper for a waterproof connector as claimed in claim 6, wherein each of the reinforcing walls is high enough to be brought into contact with an inside wall surface of the terminal receiving hole when inserted into the terminal receiving hole.

8. The rubber stopper for a waterproof connector as claimed in claim 6, wherein the reinforcing walls are arranged at equal intervals in the substantially circumferential direction.

9. The rubber stopper for a waterproof connector as claimed in claim 6, wherein the reinforcing walls are arranged at intervals of 90° in the substantially circumferential direction.

10. The rubber stopper for a waterproof connector as claimed in claim 6, wherein each of the reinforcing walls is aligned with an adjacent reinforcing wall in the axial direction.

11. The rubber stopper as claimed in claim 1, further including a plurality of triangular ribs, each of the plurality of triangular ribs being aligned with a corresponding reinforcing wall.

12. The rubber stopper as claimed in claim 1, further including a pressure fitting piece mounted on the cylindrical body portion.

13. The rubber stopper as claimed in claim 12, wherein the pressure fitting piece includes a connecting terminal for connecting to a wire.

14. The rubber stopper as claimed in claim 11, further including a pressure fitting piece mounted on the cylindrical body portion.

15. The rubber stopper as claimed in claim 14, wherein the pressure fitting piece includes a connecting terminal for connecting to a wire.

16. The rubber stopper as claimed in claim 6, further including a plurality of triangular ribs, each of the plurality of triangular ribs being aligned with a corresponding reinforcing wall.

17. The rubber stopper as claimed in claim 6, further including a pressure fitting piece mounted on the cylindrical body portion.

18. The rubber stopper as claimed in claim 17, wherein the pressure fitting piece includes a connecting terminal for connecting to a wire.

19. The rubber stopper as claimed in claim 16, further including a pressure fitting piece mounted on the cylindrical body portion.

20. The rubber stopper as claimed in claim 19, wherein the pressure fitting piece includes a connecting terminal for connecting to a wire.

21. The rubber stopper for a waterproof connector as claimed in claim 1, wherein the plurality of annular sealing protrusions includes a first annular sealing protrusion, a second annular sealing protrusion and a third annular sealing protrusion, and wherein reinforcing walls extending in the axial direction between the first and second annular sealing protrusions are out of alignment in the axial direction relative to reinforcing walls between the second and third annular sealing protrusions.

22. The rubber stopper for a waterproof connector as claimed in claim 21, wherein the reinforcing walls have a flat, radially outer surface.

23. The rubber stopper for a waterproof connector as claimed in claim 1, wherein the reinforcing walls have a flat, radially outer surface.

24. The rubber stopper for a waterproof connector as claimed in claim 11, wherein the plurality of annular sealing protrusions includes a first annular sealing protrusion, a second annular sealing protrusion and a third annular sealing protrusion, and wherein reinforcing walls extending in the axial direction between the first and second annular sealing protrusions are out of alignment in the axial direction relative to reinforcing walls between the second and third annular sealing protrusions.

25. The rubber stopper for a waterproof connector as claimed in claim 24, wherein the reinforcing walls have a flat, radially outer surface.

26. The rubber stopper for a waterproof connector as claimed in claim 11, wherein the reinforcing walls have a flat, radially outer surface.

27. The rubber stopper for a waterproof connector as claimed in claim 6, wherein the plurality of annular sealing protrusions includes a first annular sealing protrusion, a second annular sealing protrusion and a third annular sealing protrusion, and wherein reinforcing walls extending in the axial direction between the first and second annular sealing protrusions are out of alignment in the axial direction relative to reinforcing walls between the second and third annular sealing protrusions.

28. The rubber stopper for a waterproof connector as claimed in claim 27, wherein the reinforcing walls have a flat, radially outer surface.

29. The rubber stopper for a waterproof connector as claimed in claim 6, wherein the reinforcing walls have a flat, radially outer surface.

30. The rubber stopper for a waterproof connector as claimed in claim 16, wherein the plurality of annular sealing protrusions includes a first annular sealing protrusion, a second annular sealing protrusion and a third annular sealing protrusion, and wherein reinforcing walls extending in the axial direction between the first and second annular sealing protrusions are out of alignment in the axial direction relative to reinforcing walls between the second and third annular sealing protrusions.

31. The rubber stopper for a waterproof connector as claimed in claim 30, wherein the reinforcing walls have a flat, radially outer surface.

32. The rubber stopper for a waterproof connector as claimed in claim 16, wherein the reinforcing walls have a flat, radially outer surface.

* * * * *